Nov. 15, 1938.                 B. J. KLEERUP                   2,136,746
                                SLIDE CARRIER
                             Filed Aug. 16, 1937
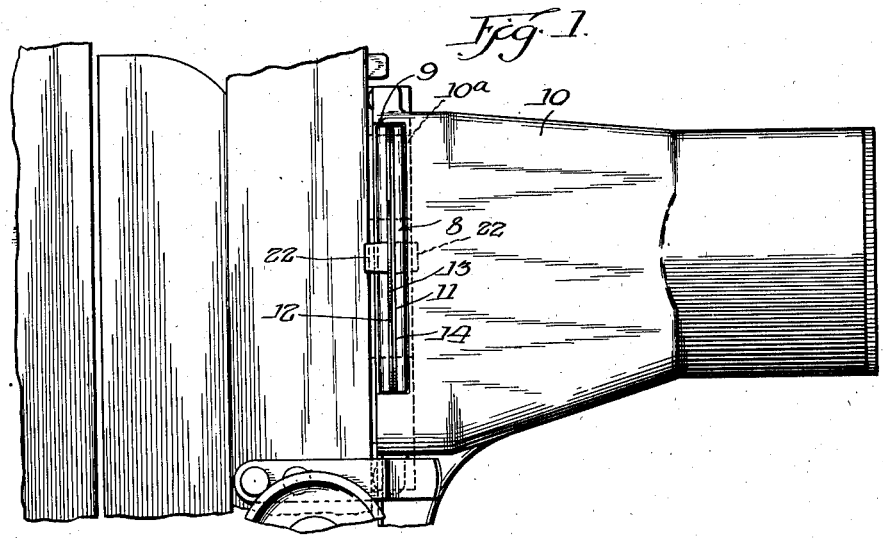
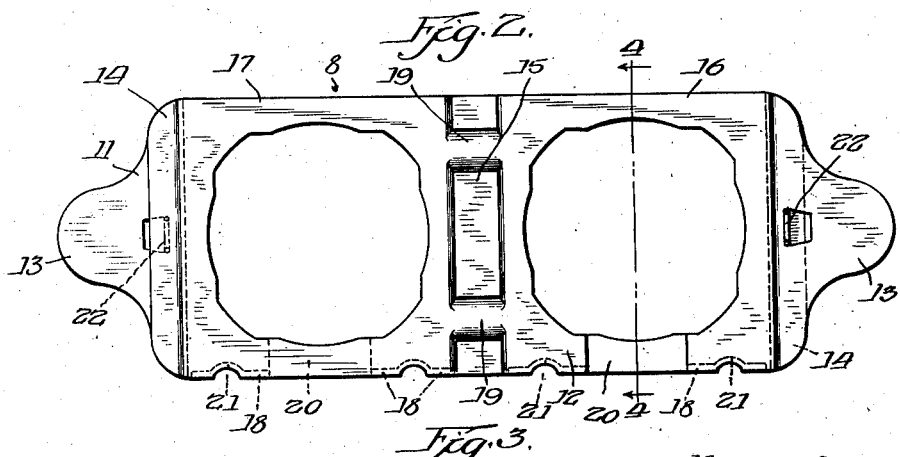
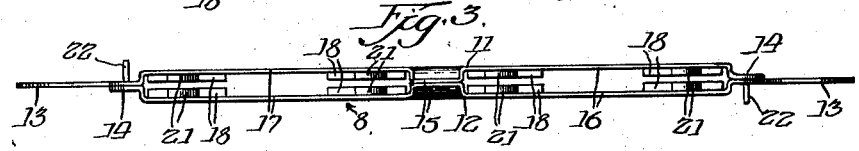
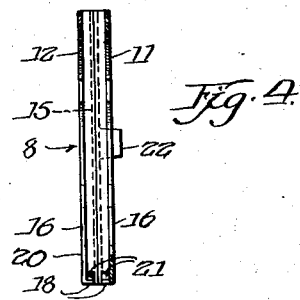
Inventor:
Bertel J. Kleerup:
By: Paul Carpenter
                Atty:

Patented Nov. 15, 1938

2,136,746

UNITED STATES PATENT OFFICE 2,136,746

SLIDE CARRIER

Bertel J. Kleerup, Chicago, Ill., assignor to Society for Visual Education, Inc., Chicago, Ill., a corporation of Delaware Application August 16, 1937, Serial No. 159,248

3 Claims. (Cl. 88—28)

This invention relates to improvements in projectors, stereopticon machines and the like.

This application is a continuation in part of my application Serial No. 88,364, filed July 1, 1936, which has become Patent No. 2,113,844, dated April 12, 1938.

In the use of conventional projectors, stereopticon machines and the like, the operator removes the slides or plates from the holder by grasping them at the upper edges, but in so doing his fingers frequently come into contact with the exposure portions of the plates, thereby leaving finger marks or smudges which impair the quality of the projected picture when the plates are again used, unless in the meantime the plates have been cleaned which may even cause permanent injury or destruction of the slide itself.

One object of the present invention is to provide a plate holder so constructed that the plates can first be raised from the holder a distance enabling the operator to grasp opposite edges thereof without likelihood of touching upon the surfaces of the plates and smudging the same and thus eliminating the necessity for frequent cleaning of finger marks.

Another object of the invention is to provide a plate holder of simple construction which is formed preferably of two identical blanks secured together to provide plate holding chambers and preferably having recesses enabling the plates to be elevated by the thumb or finger of the operator to a position wherein he can grasp the plate by the vertical edges to avoid smearing the surfaces of the plate by contact with the fingers.

My invention contemplates such other and further objects as will appear as the description of my invention and apparatus proceeds.

In the drawing:

Fig. 1 is a fragmentary side elevation of a projector embodying the invention;

Fig. 2 is a front elevation of the improved plate holder removed from the projector;

Fig. 3 is a top plan view of the plate holder of Fig. 2; and

Fig. 4 is a transverse section taken on line 4—4 of Fig. 2 looking in the direction of the arrows.

In the use of my invention herein disclosed, I contemplate its adaptation to any kind of projector, stereopticon machine or the like, and the projector shown in fragment in Fig. 1 of the drawing is of a well-known type for the projection of still pictures from continuous film or from slides or plates.

The present improvement relates to holders for the conventional slides or plates to be projected.

The holder indicated generally by reference character 8 slides transversely of the machine in the usual manner in a passage 9 provided in the gate-like objective lens housing 10 carried on a hinge 10a. The plate holder preferably comprises two identical plates 11 and 12 which may be stamped from sheet metal or other suitable material and each having co-planar end and intermediate portions 13, 14 and 15, and offset apertured plate-chamber defining portions 16 and 17. The plates 10 are secured together by any suitable means, as by welding the same at their contact portions. The chamber portions 16 and 17 are open at their upper ends, permitting the insertion of the slides or plates in the usual manner. The bottoms of the chambers 16 and 17 are formed by flanges 18 directed inwardly of the offset portions 16 and 17 at the lower edges thereof. The co-planar intermediate portions 15 have offset portions 19 in the same plane as the plate-chamber defining portions 16 and 17 to provide a unified structure having even surfaces to facilitate uninterrupted travel of the holder 8 in the passage 9 of the projector.

Each plate is also shown provided with a slot 20 extending from one of the light apertures through the bottom edge of the plate. The flanges 18 are provided with upwardly extending portions 21 to supply a two-point contact for the slides or plates affording accurate and even positioning of the slides in the carrier. Portions of the flanges 18 in register with the slots 20 are cut away to provide easy access for the operator's fingers. These slots provide recesses for accommodating a finger or thumb of the operator in engaging the bottom edge of the plates to elevate them partially from the holder to a position wherein the plates can be grasped at the vertical edges and removed, thus avoiding any touching or handling of the projection portions of the slots or plates.

The co-planar end portions 13 of each plate are provided with stud-like members 22 adapted to bear against stop members (not shown) carried on the lens holder 10 when the projecting portion of the plate is in register with the lens. To insert the slide carrier 8, the gate-like lens holder 10 is swung to an open position upon its hinge, exposing the passage 9 for the removal and insertion of slide carriers.

The foregoing detailed description has been given for clearness of understanding only, and no unnecessary limitations should be understood therefrom, but the appended claims should be construed as broadly as permissible, in view of the prior art.

Having thus described my invention and illustrated its use, what I claim as new and desire to secure by Letters Patent is:

1. A slide carrier comprising a pair of plates, each having co-planar end and intermediate portions and light apertured offset portions and flanges at the lower end thereof, said plates being secured, together with the co-planar portions thereof, in face to face contact whereby the offset portions define a plurality of slide receiving chambers, the flanges of each chamber having a pair of raised portions adapted to support slides, and slots in one side and the bottom of each flange in register for permitting insertion of members to partially elevate a slide when said carrier is in slide removing position.

2. A slide carrier comprising a pair of identical plates, each having co-planar end and intermediate portions and light apertured offset portions and upwardly extending flanges at the lower ends thereof providing a plurality of supports for each slide, said plates being secured, together with the co-planar portions, in face to face contact and with the complementary offset portions defining slide receiving chambers, said co-planar intermediate portions having sections in the same plane as said offset portions, and slots in the bottom and one side of each chamber to receive members for partially elevating slides when said slides are in slide-removing position.

3. A slide carrier comprising a pair of substantially identical plates, said plates having co-planar end and intermediate light apertured offset portions, said plates being secured, together with the co-planar portions thereof, in face to face contact whereby the offset portions define a plurality of slide receiving chambers upwardly extending flanges at the base of each chamber providing a plurality of supports for each slide, each of said end portions carrying stud members adapted to bear against abutment members adjacent said carrier when said light apertured portions are properly disposed, and cutaway portions below and adjacent to said upwardly extending flanges to permit the insertion of members to partially elevate slides when said slides are in slide-removing position.

BERTEL J. KLEERUP.